June 6, 1939. H. VOLLMANN ET AL 2,161,645
CATALYST FOR ACETYLENE REACTIONS AND A PROCESS OF
PREPARING POLYMERIC COMPOUNDS OF ACETYLENE
Filed Nov. 16, 1937
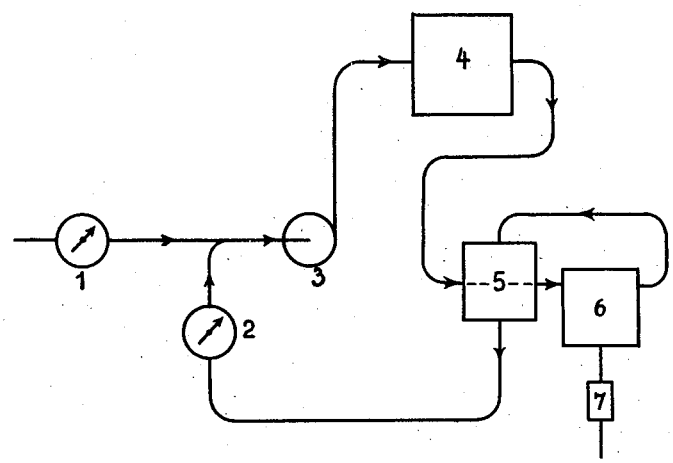
Heinrich Vollmann
Bernhard Schacke
INVENTORS
BY
THEIR ATTORNEYS Patented June 6, 1939

2,161,645

UNITED STATES PATENT OFFICE 2,161,645

CATALYST FOR ACETYLENE REACTIONS AND A PROCESS OF PREPARING POLYMERIC COMPOUNDS OF ACETYLENE

Heinrich Vollmann and Bernhard Schacke, Frankfort-on-the-Main-Hochst, Germany, assignors to I. G. Farbenindustrie Aktiengesellschaft, Frankfort-on-the-Main, Germany Application November 16, 1937, Serial No. 174,832
In Germany November 21, 1936

11 Claims. (Cl. 260—678)

The present invention relates to a catalyst for acetylene reactions and to a process of preparing polymeric products of acetylene.

The preparation of non-cyclic polymeric products of acetylene by causing solutions of cuprous chloride complex salts to act upon acetylene is known. As contact substances there are used, for instance according to U. S. Patent No. 1,811,959, aqueous solutions of cuprous salts together with ammonium salts or salts of tertiary amines, the solutions being preferably kept in a feebly acid condition by the addition of inorganic acids.

For obtaining high yields of monovinyl acetylene, while avoiding the formation of higher polymeric products of acetylene, particular steps are necessary the most important of which consists in eliminating as completely as possible the monovinyl acetylene, by cooling to about −75° C., from the current of acetylene present in excess and caused to circulate.

In operating with the contact solutions named above, a number of technical drawbacks become evident by which the economy of the process is considerably impaired:

1. The contact solutions deliver steam to the reaction gas. In order to avoid a clogging of the cooling device by ice this content of water must be completely removed by suitable driers (for instance solid calcium chloride, concentrated calcium chloride solutions, calcium carbide or alcohols at a temperature below 0° C.), especially if it is intended to obtain monovinyl acetylene. On the other hand, care must be taken by further arrangements that the water eliminated from the contact solution is made good.

2. By the water which is present in the contact solution—in the presence of heavy metal salts and acids—undesirable by-products are formed, such as acetaldehyde and vinyl methyl ketone which, on the one hand, contribute to the rapid resinification of the contact mass and, on the other hand, impair the purification of the polymeric product of acetylene desired.

3. At those places in the contact vessel where the contact substances thrown upwards come in contact with water (either reflux water or condensate on the cooler parts of the wall) semisolid dark brown deposits are formed containing acetylene and copper which hinder the circulation of the gas and moreover, when dry, may lead to explosions.

Now we have found that as contact substances for the polymerization of acetylene there may be used with advantage salt mixtures of cuprous salts and salts of ammonia, or of aliphatic and hydroaromatic amines, furthermore salts of heterocyclic nitrogen bases. These mixtures must fuse below 200° C. The complex salt hitherto not yet described from 1 mol of methylamine hydrochloride and 1 mol of cuprous chloride, for instance, melts already at 80° C. and without the addition of water or an organic solvent and likewise without the addition of an inorganic or organic acid acts, at temperatures of 90° C. to 100° C. as an excellent contact mass for the polymerization of acetylene so as to obtain monovinyl acetylene and divinyl acetylene. The yield within a certain time and space, that is the quantity of the polymeric product of acetylene obtainable per liter of contact mass and per hour nearly corresponds with the hitherto known aqueous contact solutions, and as to length of life the fusible contact mass is not inferior to the contact solutions. During the process the drawbacks of the aqueous contact solutions described above are entirely avoided.

The fusible salt mass used in the invention may contain, besides cuprous salts—preferably cuprous chloride or likewise cuprous bromide or cuprous iodide—a salt of an amine or heterocyclic base or several different amine salts of this kind, for instance hydrochlorides or hydrobromides of ammonia, mono- to trialkyl amines such as monomethyl amine, dimethyl amine, trimethyl amine as well as the corresponding ethyl amines, hydroxyalkyl amines such as ethanol amine and triethanol amine, ethylene diamine, cyclohexyl amine, methylcyclohexyl amine, piperidine, pyridine, quinoline, quinaldine and other strong organic bases including the salts of quaternary ammonium hydroxides. The hydrochlorides of aromatic amines, however, have been found to be less suitable for the process claimed herein. Additions of alkali metal halides and alkaline earth metal halides, in so far as they reduce the solidifying point of the fused mass, as well as small quantities of hydrohalogen acid may be advantageous.

The reaction temperatures are regulated according to, among other considerations, the fusing point of the mixture of catalysts; it is possible to prepare mixtures which melt already at about 50° C. The process is preferably operated at about 90° C. to about 100° C., but it is also possible to use temperatures up to about 200° C.

The quantitative proportions of the components contained in the mixture of catalysts may vary within wide limits. Preferably mixtures are used which contain per about 1 mol of cuprous salt about 1 mol to 2 mols of the salt of ammonia or of the amine or base. In order to reduce the fusing temperature of the mixture there may be added a still greater quantity of salts of nitrogen bases.

The physical solubility of the acetylene in the fusible contact mass is—just as in the case of aqueous contact solutions—relatively small. Consequently a maximum reaction is attained only by taking care by a very good distribution of the gas that the acetylene used is always made good immediately at every part of the contact mass.

Acetylene and the salt masses named above are preferably caused to react in the cyclic operation in the following manner: The polymeric products of acetylene are eliminated in a suitable, known manner from the reaction gas and the excess of acetylene together with fresh acetylene is reconducted into the contact mass.

A suitable apparatus for the production of preferably monovinyl acetylene is diagrammatically illustrated in the accompanying drawing.

The fresh acetylene passes through the measuring device 1 by way of the blower 3 into the reaction vessel 4; the gases then pass through the heat exchange device 5 and the low temperature cooling device 6 from which the polymeric substance flows into the vessel 7. The rest of the acetylene is reconducted into the cycle by way of the measuring device 2.

The following examples serve to illustrate the invention, but they are not intended to limit it thereto:

1. 5 kilos of methylamine hydrochloride and 5 kilos of cuprous chloride are fused together in an enamelled vessel at the temperature of the water bath with exclusion of oxygen (the volume of the fused mass amounts to about 5.3 liters). A current of acetylene of 1.8 m.$^3$ per hour is caused to pass through this molten mass at a temperature of 95° C. while well distributing it by a rapidly running blade stirrer. The polymeric products of acetylene are eliminated at about —70° C. in the cooling device by condensation from the reaction gas after the latter has passed through the heat exchanger. The residual acetylene is reconducted into the reaction vessel after the portion consumed has been made good (compare the accompanying drawing). Under the conditions named above about 0.15 m.$^3$ of acetylene are caused to react per hour and in correspondence therewith about 165 grams of the liquid polymeric product of acetylene are produced. The liquid product contains about 80 per cent. of monovinyl acetylene and 15 per cent. of a polymeric product of acetylene of higher boiling point besides a small quantity of dissolved acetylene. Contrary to the crude polymeric products produced with the aid of aqueous contact solutions, acetaldehyde and ketones are not detectable in the crude product obtainable according to this invention.

If under otherwise the same conditions the cycle of acetylene is reduced to 0.9 m.$^3$ per hour, so that the proportion of reacting volume to circulating volume decreases from about 1 to 10 to about 1 to 5, about the same yield of liquid crude polymeric product free from aldehyde and ketone is obtained. The content of monovinyl acetylene is in this case somewhat smaller, i. e. about 70 per cent. to 75 per cent. whereas the portion of the polymeric product of higher boiling point has increased to 20 per cent. to 25 per cent. At the same time the reaction gas contains about twice the quantity of polymeric product of acetylene, the output of the cooling device being considerably raised thereby.

2. The operation is performed in the same apparatus as in Example 1. As a contact substance there is used a fused mass which is composed of 1 part by weight of cuprous chloride to 0.53 part of ammonium chloride. The solidification point of this fused mass is at about 140° C. After the treatment with acetylene the solidification point further decreases, evidently by the formation of the complex salt. At an operating temperature of 150° C., a proportion of the circulation of 1 to 10 to 1 to 12 and a cooling of the reaction gases to about —70° C. the liquid reaction product obtained contains 75 per cent. to 80 per cent. of monovinyl acetylene.

3. A fused mass of 5 kilos of piperidine hydrochloride and 5 kilos of cuprous chloride which is moved at 90° C. on a cylindrical horizontal vessel by bucket stirrers or divided by rapidly rotating stirrers (of the kind used in known gas scrubbers) into liquid fog, is brought in contact with a current of acetylene of 1.8 m.$^3$ per hour. By the condensation in a cooling device at —70° C. there are obtained per hour about 165 grams of the polymeric product of acetylene free from aldehyde and ketone; when a proportion of circulation of 1 to 10 to 1 to 12 is observed, the product contains 85 per cent. of monovinyl acetylene.

If the reaction gas in the cooling device is not cooled to —70° C. but only to —50° C. up to 0° C. and the residual gas is reconducted in a cycle into the reaction vessel, the same fusible contact mass yields with increasing cooling temperature increasing quantities of a polymeric product of acetylene of higher boiling point. By appropriately choosing the cooling temperature and the proportion of the circulation divinyl acetylene is obtained as a main product.

4. In a heated trickling tower a fused mass which is still liquid at 30° C. and consists of 1 kilo of dimethylamine hydrochloride, 1 kilo of trimethylamine hydrochloride, 1 kilo of ethanolamine hydrochloride and 2.5 kilos of cuprous chloride, is caused to circulate by pumping at a temperature of 90° C. At the same time acetylene is passed through the tower, either in a continuous current or in counter-current to the fused mass. The contact mass has a specific gravity of 1.6 and yields about 25 grams of a liquid polymeric product of acetylene per liter of contact mass per hour. The composition of the product obtained depends in this case just as in the preceding examples on the temperature of the cooling device and the time it remains in contact with the contact mass. The latter depends on the length of the circuit of the fused mass and of the current of gas as well as on the kind of the filling body in the tower.

We claim:

1. In the process of preparing from acetylene hydrocarbons of higher molecular weight the step which comprises bringing the acetylene in contact with a molten, substantially anhydrous mixture comprising a cuprous salt, and at least one compound of the group consisting of salts of ammonia, aliphatic amines, hydroaromatic amines, and heterocyclic nitrogen bases.

2. In the process of preparing from acetylene hydrocarbons of higher molecular weight the step which comprises bringing the acetylene in contact with a molten, substantially anhydrous mixture comprising cuprous chloride, and at least one compound of the group consisting of the hydrochlorides of ammonia, aliphatic amines, hydroaromatic amines, and heterocyclic nitrogen bases.

3. In the process of preparing from acetylene hydrocarbons of higher molecular weight the step which comprises bringing the acetylene in contact with a molten, substantially anhydrous mixture comprising cuprous chloride, and at least one compound of the group consisting of the hydrochlorides of ammonia, aliphatic amines, hydroaromatic amines, and heterocyclic nitrogen bases, said mixture having a temperature between about 50° C. and about 200° C.

4. In the process of preparing from acetylene hydrocarbons of higher molecular weight the step which comprises bringing the acetylene in contact with a molten, substantially anhydrous mixture of equal parts of cuprous chloride and methylamine hydrochloride at a temperature of 95° C.

5. In the process of preparing from acetylene hydrocarbons of higher molecular weight the step which comprises bringing the acetylene in contact with a molten, substantially anhydrous mixture of 1 part of cuprous chloride and 0.53 part of ammonium chloride at a temperature of 150° C.

6. In the process of preparing from acetylene hydrocarbons of higher molecular weight the step which comprises bringing the acetylene in contact with a molten, substantially anhydrous mixture of equal parts of cuprous chloride and piperidine hydrochloride at a temperature of 90° C.

7. A catalyst for acetylene reactions comprising a molten, substantially anhydrous mixture of a cuprous salt, and at least one compound of the group consisting of salts of ammonia, aliphatic amines, hydroaromatic amines, and heterocyclic nitrogen bases.

8. A catalyst for acetylene reactions comprising a molten, substantially anhydrous mixture of cuprous chloride, and at least one compound of the group consisting of the hydrochlorides of ammonia, aliphatic amines, hydroaromatic amines, and heterocyclic nitrogen bases.

9. A catalyst for acetylene reactions comprising a molten, substantially anhydrous mixture of equal parts of cuprous chloride and methylamine hydrochloride.

10. A catalyst for acetylene reactions comprising a molten, substantially anhydrous mixture of 1 part of cuprous chloride and 0.53 part of ammonium chloride.

11. A catalyst for acetylene reactions comprising a molten, substantially anhydrous mixture of equal parts of cuprous chloride and piperidine hydrochloride.

HEINRICH VOLLMANN.
BERNHARD SCHACKE.